United States Patent
Abraham et al.

(10) Patent No.: US 7,327,310 B2
(45) Date of Patent: Feb. 5, 2008

(54) METHOD AND APPARATUS FOR MANAGING TIME IN A SATELLITE POSITIONING SYSTEM

(75) Inventors: Charles Abraham, Los Gatos, CA (US); Javier De Salas, Madrid (ES); David McMahan, Raleigh, NC (US)

(73) Assignee: Global Locate, Inc., San Jose, CA (US)

( * ) Notice: Subject to any disclaimer, the term of this patent is extended or adjusted under 35 U.S.C. 154(b) by 153 days.

(21) Appl. No.: 10/976,191

(22) Filed: Oct. 28, 2004

(65) Prior Publication Data

US 2005/0146462 A1    Jul. 7, 2005

Related U.S. Application Data

(60) Provisional application No. 60/518,180, filed on Nov. 7, 2003.

(51) Int. Cl.
*G01S 1/00* (2006.01)

(52) U.S. Cl. .............................. 342/357.02; 342/357.12

(58) Field of Classification Search ........... 342/357.01, 342/357.02, 357.06, 357.12; 701/207, 213, 701/215
See application file for complete search history.

(56) References Cited

U.S. PATENT DOCUMENTS

| | | | |
|---|---|---|---|
| 5,752,218 A * | 5/1998 | Harrison et al. ............. | 701/207 |
| 5,945,944 A | 8/1999 | Krasner | |
| 6,204,808 B1 | 3/2001 | Bloebaum et al. | |
| 6,266,533 B1 | 7/2001 | Zadeh et al. | |
| 6,323,804 B1 * | 11/2001 | Kurby et al. ........... | 342/357.06 |
| 6,356,763 B1 | 3/2002 | Kangas et al. | |
| 6,417,800 B1 * | 7/2002 | Valio et al. ............. | 342/357.02 |
| 6,429,811 B1 * | 8/2002 | Zhao et al. ............. | 342/357.09 |
| 6,433,734 B1 * | 8/2002 | Krasner ................. | 342/357.09 |
| 6,433,739 B1 | 8/2002 | Soliman | |
| 6,603,978 B1 | 8/2003 | Carlsson et al. | |
| 6,839,020 B2 * | 1/2005 | Geier et al. ............. | 342/357.02 |
| 2002/0193108 A1 * | 12/2002 | Robinett ..................... | 455/427 |
| 2003/0016167 A1 | 1/2003 | Dooley et al. | |
| 2005/0070223 A1 * | 3/2005 | Camp et al. ................ | 455/13.2 |
| 2006/0111840 A1 * | 5/2006 | van Diggelen .............. | 701/215 |

OTHER PUBLICATIONS

PCT International Preliminary Report on Patentability mailed May 18, 2006 for corresponding PCT Application No. PCT/US2004/036719.

PCT Written Opinion of International Search Authority mailed May 18, 2006 for corresponding PCT Application No. PCT/US2004/036719.

* cited by examiner

*Primary Examiner*—Dao Phan
(74) *Attorney, Agent, or Firm*—McAndrews Held & Malloy Ltd.

(57) ABSTRACT

Method and apparatus for time management in a position location system is described. In one example, a time relation is received at a server. The time relation includes a relationship between an air-interface time of a base station and a satellite time for a satellite constellation from a first satellite positioning system (SPS) receiver. The time relation is then stored in the server. In another example, satellite time is determined at a first time for a satellite constellation at an SPS receiver. A time offset is determined between the satellite time and an air-interface time of a base station. The time offset is stored within the SPS receiver. A position of the SPS receiver is computed at a second time using satellite measurements and the stored time offset.

19 Claims, 7 Drawing Sheets

METHOD AND APPARATUS FOR MANAGING TIME IN A SATELLITE POSITIONING SYSTEM

CROSS-REFERENCE TO RELATED APPLICATIONS

This application claims benefit of U.S. provisional patent application Ser. No. 60/518,180, filed Nov. 7, 2003, which is herein incorporated by reference.

BACKGROUND OF THE INVENTION

1. Field of the Invention

Embodiments of the present invention generally relate to satellite position location systems and, more particularly, to a method and apparatus for managing time in a satellite positioning system.

2. Description of the Related Art

Global Positioning System (GPS) receivers use measurements from several satellites to compute position. GPS receivers normally determine their position by computing time delays between transmission and reception of signals transmitted from satellites and received by the receiver on or near the surface of the earth. The time delays multiplied by the speed of light provide the distance from the receiver to each of the satellites that are in view of the receiver.

More specifically, each GPS signal available for commercial use utilizes a direct sequence spreading signal defined by a unique pseudo-random noise (PN) code (referred to as the coarse acquisition (C/A) code) having a 1.023 MHz spread rate. Each PN code bi-phase modulates a 1575.42 MHz carrier signal (referred to as the L1 carrier) and uniquely identifies a particular satellite. The PN code sequence length is 1023 chips, corresponding to a one millisecond time period. One cycle of 1023 chips is called a PN frame or epoch.

GPS receivers determine the time delays between transmission and reception of the signals by comparing time shifts between the received PN code signal sequence and internally generated PN signal sequences. These measured time delays are referred to as "sub-millisecond pseudoranges", since they are known modulo the 1 millisecond PN frame boundaries. By resolving the integer number of milliseconds associated with each delay to each satellite, then one has true, unambiguous, pseudoranges. A set of four pseudoranges together with a knowledge of absolute times of transmission of the GPS signals and satellite positions in relation to these absolute times is sufficient to solve for the position of the GPS receiver. The absolute times of transmission (or reception) are needed in order to determine the positions of the GPS satellites at the times of transmission and hence to compute the position of the GPS receiver.

Accordingly, each of the GPS satellites broadcasts information regarding the satellite orbit and clock data known as the satellite navigation message. The satellite navigation message is a 50 bit-per-second (bps) data stream that is modulo-2 added to the PN code with bit boundaries aligned with the beginning of a PN frame. There are exactly 20 PN frames per data bit period (20 milliseconds). The satellite navigation message includes satellite-positioning data, known as "ephemeris" data, which identifies the satellites and their orbits, as well as absolute time information (also referred to herein as "GPS time", "satellite time", or "time-of-day") associated with the satellite signal. The absolute time information is in the form of a second of the week signal, referred to as time-of-week (TOW). This absolute time signal allows the receiver to unambiguously determine a time tag for when each received signal was transmitted by each satellite.

In some GPS applications, the signal strengths of the satellite signals are so low that either the received signals cannot be processed, or the time required to process the signals is excessive. As such, to improve the signal processing, a GPS receiver may receive assistance data from a network to assist in satellite signal acquisition and/or processing. For example, the GPS receiver may be integrated within a cellular telephone and may receive the assistance data from a server using a wireless communication network. This technique of providing assistance data to a remote mobile receiver has become known as "Assisted-GPS" or A-GPS.

In some A-GPS systems, the wireless communication network that provides the assistance data is not synchronized to GPS time. Such non-synchronized networks include time division multiple access (TDMA) networks, such as GSM networks, universal mobile telecommunications system (UMTS) networks, North American TDMA networks (e.g., IS-136), and personal digital cellular (PDC) networks. Presently, absolute time information is obtained at the base stations of such wireless networks using location measurement units (LMUs). The LMUs include a GPS receiver, which is used to receive and decode the TOW information from the satellites in view of the base station. The LMU then computes an offset value between GPS time and the time as known by the base stations that are near the LMU. The offset is then supplied to the base stations for them to use to correct their local time. One disadvantage associated with LMUs is that the wireless communication network typically includes many thousands of base stations, thus requiring many LMUs. Providing a large number of LMUs is significantly expensive and is thus undesirable.

Therefore, there exists a need in the art for a method and apparatus that manages time within an assisted satellite positioning network without employing LMUs.

SUMMARY OF THE INVENTION

Method and apparatus for time management in a position location system is described. In one embodiment, a time relation is received at a server. The time relation comprises a relationship between an air-interface time of a base station and a satellite time for a satellite constellation from a first satellite positioning system (SPS) receiver. The time relation is then stored in the server. In one embodiment, the time relation may be compensated for propagation delay between the first SPS receiver and the base station. In one embodiment, satellite measurements are received at the server from a second SPS receiver, where the satellite measurements are time stamped using the air-interface time of the base station. The server may then compute position of the second SPS receiver using the satellite measurements and the time relation stored for the base station. In another embodiment, the server may send the time relation to the second SPS receiver, and the second SPS receiver may compute its own position using the satellite measurements.

In another embodiment, satellite time is determined at a first time for a satellite constellation at an SPS receiver. A time offset is determined between the satellite time and an air-interface time of a base station. The time offset is stored within the SPS receiver. A position of the SPS receiver is computed at a second time using satellite measurements and the stored time offset.

In another embodiment, satellite time is determined at a first time for a satellite constellation at an SPS receiver. A time offset is determined between the satellite time and an air-interface time of a base station. The time offset is stored within the SPS receiver. Clock circuitry in the SPS receiver is synchronized to the satellite time at a second time using the time offset in response to a handover from the base station to another base station. Another time offset is determined between the satellite time and another air-interface time of the other base station using the synchronized clock circuitry.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

A method and apparatus for managing time in a satellite positioning system is described. Those skilled in the art will appreciate that the invention may be used with various types of mobile or wireless devices that are "location-enabled," such as cellular telephones, pagers, laptop computers, personal digital assistants (PDAs), and like type wireless devices known in the art. Generally, a location-enabled mobile device is facilitated by including in the device the capability of processing satellite positioning system (SPS) satellite signals.

Figure 1:
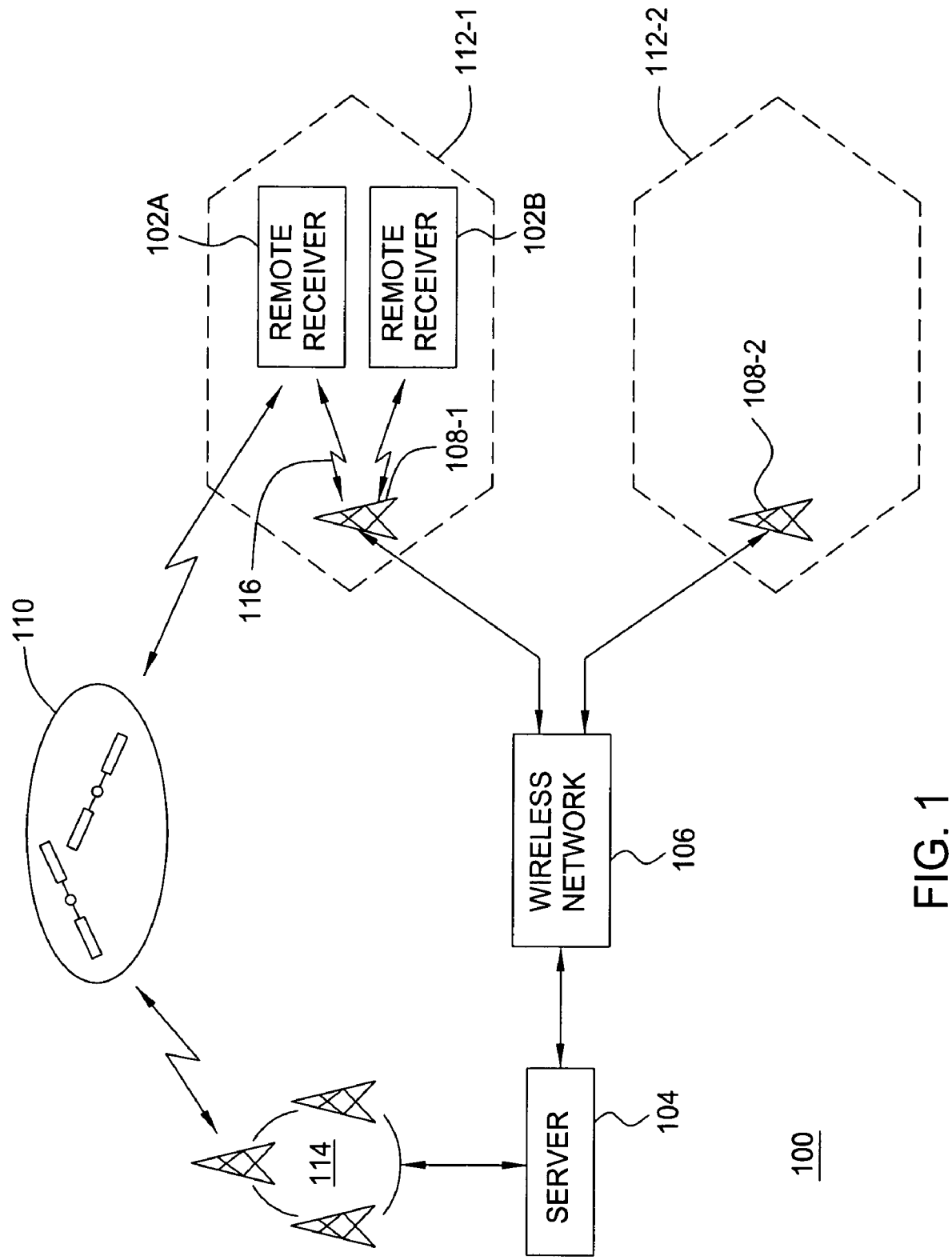
FIG. 1 is a block diagram depicting an exemplary embodiment of a position location system.

FIG. 1 is a block diagram depicting an exemplary embodiment of a position location system 100. The system 100 illustratively comprises remote receivers 102A and 102B (collectively referred to as remote receivers 102) in communication with a server 104 via a wireless communication network 106 (e.g., a cellular telephone network). The server 104 may be disposed in a serving mobile location center (SMLC) of the wireless communication network 106. The remote receivers 102 obtain satellite measurement data with respect to a plurality of satellites 110 (e.g., pseudoranges, Doppler measurements). The server 104 obtains satellite navigation data for the satellites 110 (e.g., orbit trajectory information, such as ephemeris). Position information for the remote receivers 102 is computed using the satellite measurement data and the satellite navigation data.

The wireless communication network 106 comprises a non-synchronized communication network (i.e., the network is not synchronized with satellite time). The wireless communication network 106 is illustratively shown as including a base station 108-1 having a service area 112-1, and a base station 108-2 having a service area 112-2. Base stations of the wireless communication network 106 may also be referred to as "cell sites". It is to be understood that the wireless network 106 typically includes may more base stations. The remote receivers 102 are illustratively shown as being within the service area 112-1. Wireless links 116 may be established between the remote receivers 102 and the base station 108-1. Notably, communication between the base stations 108-1 and the remote receivers 102 is facilitated by a wireless signal having a particular timing structure (referred to herein as "air-interface timing"). For purposes of clarity by example, only two remote receivers are shown within one service area. It is to be understood, that the wireless communication network may include any number of service areas that serve any number of remote receivers.

For example, in one embodiment, the wireless communication network 106 comprises a global system for mobile communications (GSM) network. For a base station in a GSM network, the air-interface timing of a wireless signal is defined by a frame number, a timeslot number, and a bit number. A frame has a duration of 4.615 milliseconds, a timeslot has a duration of 577 microseconds, and a bit has a duration of 3.69 microseconds. A GSM base station includes clock for managing its air-interface timing in a synchronous manner. The clock used by the GSM base station is a highly controlled and exhibits a low long term drift rate. Frequency offset errors are usually less than 0.05 parts per million (ppm), and long term drift rates are even lower. GSM base stations and the air-interface timing of their communications are well known in the art. Various other types of non-synchronized wireless networks exhibit air-interface timing structures similar to GSM, including, but not limited to, universal mobile telecommunications system (UMTS) networks, North American time division multiple access (TDMA) networks (e.g., IS-136), and personal digital cellular (PDC) networks. For purposes of clarity by example, various aspects of the invention are described with respect to GSM. It is to be understood, however, that the present invention may be used with other types of wireless networks, such as UMTS, TDMA, and PDC networks.

Satellite navigation data, such as ephemeris for at least the satellites 110, may be collected by a network of tracking stations ("reference network 114"). The reference network 114 may include several tracking stations that collect satellite navigation data from all the satellites in the constellation, or a few tracking stations, or a single tracking station that only collects satellite navigation data for a particular region of the world. An exemplary system for collecting and distributing ephemeris is described in commonly-assigned U.S. Pat. No. 6,411,892, issued Jun. 25, 2002, which is incorporated by reference herein in its entirety. The reference network 114 may provide the collected satellite navigation data to the server 104.

The remote receivers 102 may be configured to receive assistance data from the server 104 via the wireless network 106. For example, the remote receivers 102 may receive acquisition assistance data, satellite trajectory data, or both from the server 104. Acquisition assistance data (i.e., data configured to assist the remote receiver 102 in detecting and processing satellite signals from the satellites 110) may be computed by the server 104 using satellite trajectory data (e.g., ephemeris or other satellite trajectory model). For example, the acquisition assistance data may include expected pseudoranges (or code phases) from the satellites 110 to an assumed position of a respective one of the remote receivers 102 (approximate position) at an assumed time-of-day, or a model of expected pseudoranges (pseudorange model). Exemplary processes for forming pseudorange models as acquisition assistance data are described in commonly-assigned U.S. Pat. No. 6,453,237, issued Sep. 17, 2002, which is incorporated by reference herein in its entirety. Satellite trajectory assistance data may include ephemeris, Almanac, or some other orbit model. Notably, the satellite trajectory data may comprise a long term satellite trajectory model, as described in commonly-assigned U.S. Pat. No. 6,560,534, issued May 6, 2003, which is incorporated by reference herein in its entirety.

The position location system 100 may be configured in multiple modes of operation. In one embodiment, the remote receivers 102 obtain satellite measurements (e.g., pseudoranges) and sends the satellite measurements to the server 104 through the wireless network 106, where the server computes a position of the remote receivers 102 (referred to as a mobile station assisted or "MS-Assisted" configuration). In another embodiment, the remote receivers 102 obtain satellite trajectory data from the server and satellite measurements (e.g., pseudoranges) from the satellites 110. The remote receivers 102 use the satellite measurements and the satellite trajectory data to locate their own position (referred to as a mobile station based or "MS-Based" configuration). In yet another embodiment, the remote receivers 102 may obtain satellite trajectory data directly from the satellites 110 and locate their own position (referred to as the "autonomous" configuration). Furthermore, the remote receiver 102A may operate in a different mode than the remote receiver 102B. Regardless of the configuration employed (i.e., MS-assisted, MS-based, or autonomous), the position location system 100 may employ various embodiments of a time management process in accordance with the invention, as described below, in order to obtain a sufficiently accurate estimate of satellite time (absolute time).

Figure 2:
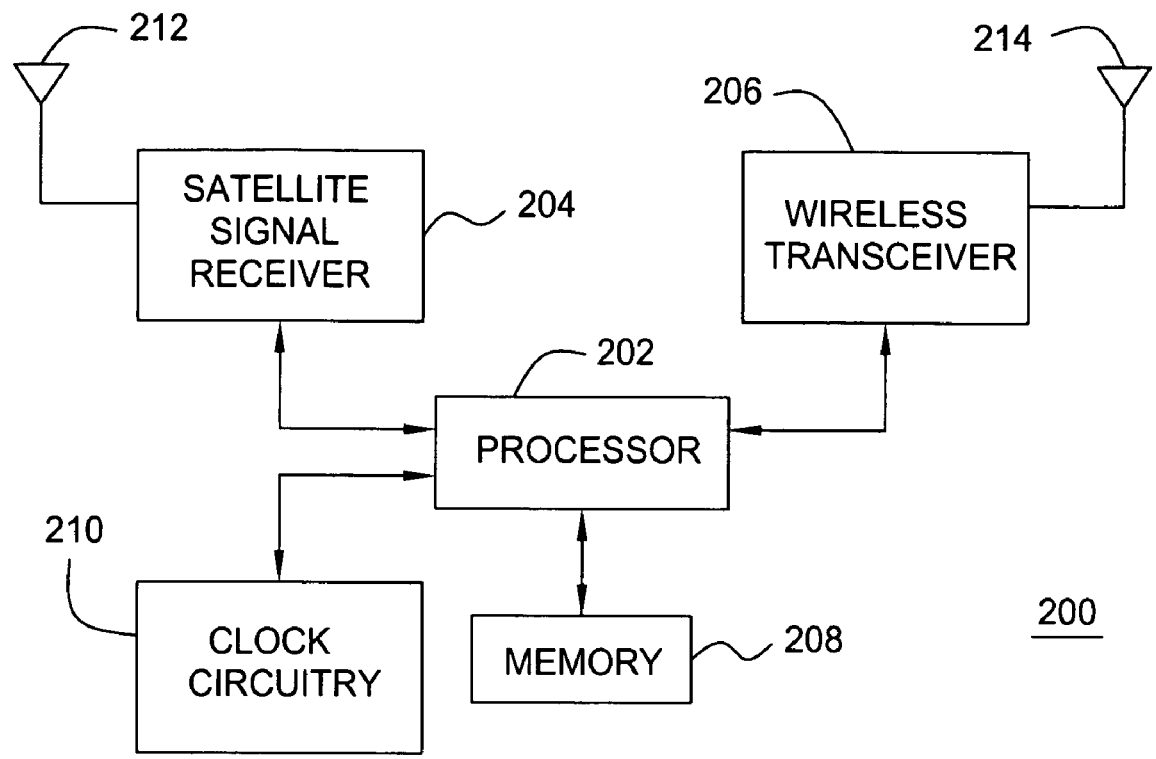
FIG. 2 is a block diagram depicting an exemplary embodiment of a remote receiver of the position location system shown in FIG. 1.

FIG. 2 is a block diagram depicting an exemplary embodiment of a remote receiver 200 in accordance with the invention. The remote receiver 200 may be used as either or both of the remote receivers 102 of FIG. 1. The remote receiver 200 illustratively comprises a satellite signal receiver 204, a wireless transceiver 206, a processor 202, a memory 208, and clock circuitry 210. The satellite signal receiver 204 receives satellite signals from the satellites 110 using an antenna 212. The satellite signal receiver 204 may comprise a conventional A-GPS receiver. An exemplary A-GPS receiver is described in U.S. Pat. No. 6,453,237, referenced above. The wireless transceiver 206 receives wireless signals from base stations of the wireless communication network 106 via an antenna 214. The satellite signal receiver 204 and the wireless transceiver 206 may be controlled by the processor 202.

The processor 202 may comprise a microprocessor, instruction-set processor (e.g., a microcontroller), or like type processing element known in the art. The processor 202 is coupled to the memory 208 and the clock circuitry 210. The memory 208 may be random access memory, read only memory, removable storage, hard disc storage, or any combination of such memory devices. Various processes and methods described herein may be implemented via software stored in the memory 208 for execution by the processor 202. Alternatively, such processes and methods may be implemented using dedicated hardware, such as an application specific integrated circuit (ASIC), or a combination of hardware and software. The clock circuitry 210 may include one or more well known clock devices, such as a real-time clock (RTC), oscillators, counters, and the like.

Figure 3:
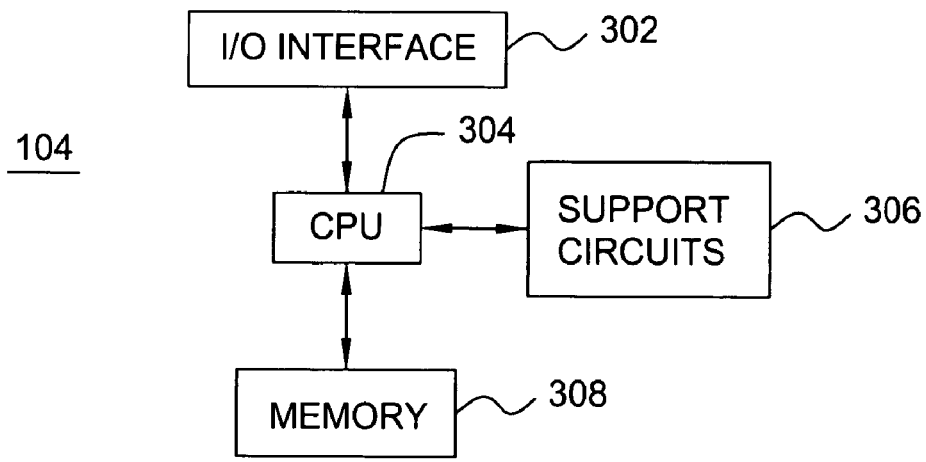
FIG. 3 is a block diagram depicting an exemplary embodiment of a server of the position location system shown in FIG. 1.

FIG. 3 is a block diagram depicting an exemplary embodiment of the server 104 of FIG. 1. The server 104 illustratively comprises an I/O interface 302, a central processing unit (CPU) 304, support circuits 306, and a memory 308. The CPU 304 is coupled to the memory 308 and the support circuits 306. The memory 308 may be random access memory, read only memory, removable storage, hard disc storage, or any combination of such memory devices. The support circuits 306 include conventional cache, power supplies, clock circuits, data registers, I/O interfaces, and the like to facilitate operation of the server 104. The I/O interface 302 is configured to receive satellite navigation data from the reference network 114. The I/O interface 302 is also configured for communication with the wireless communication network 106. Various processes and methods described herein may be implemented using software stored in the memory 308 for execution by the CPU 304. Alternatively, the server 104 may implement such processes and methods in hardware or a combination of software and hardware, including any number of processors independently executing various programs and dedicated hardware, such as application specific integrated circuits (ASICs), field programmable gate arrays (FPGAs), and the like.

Figure 4:
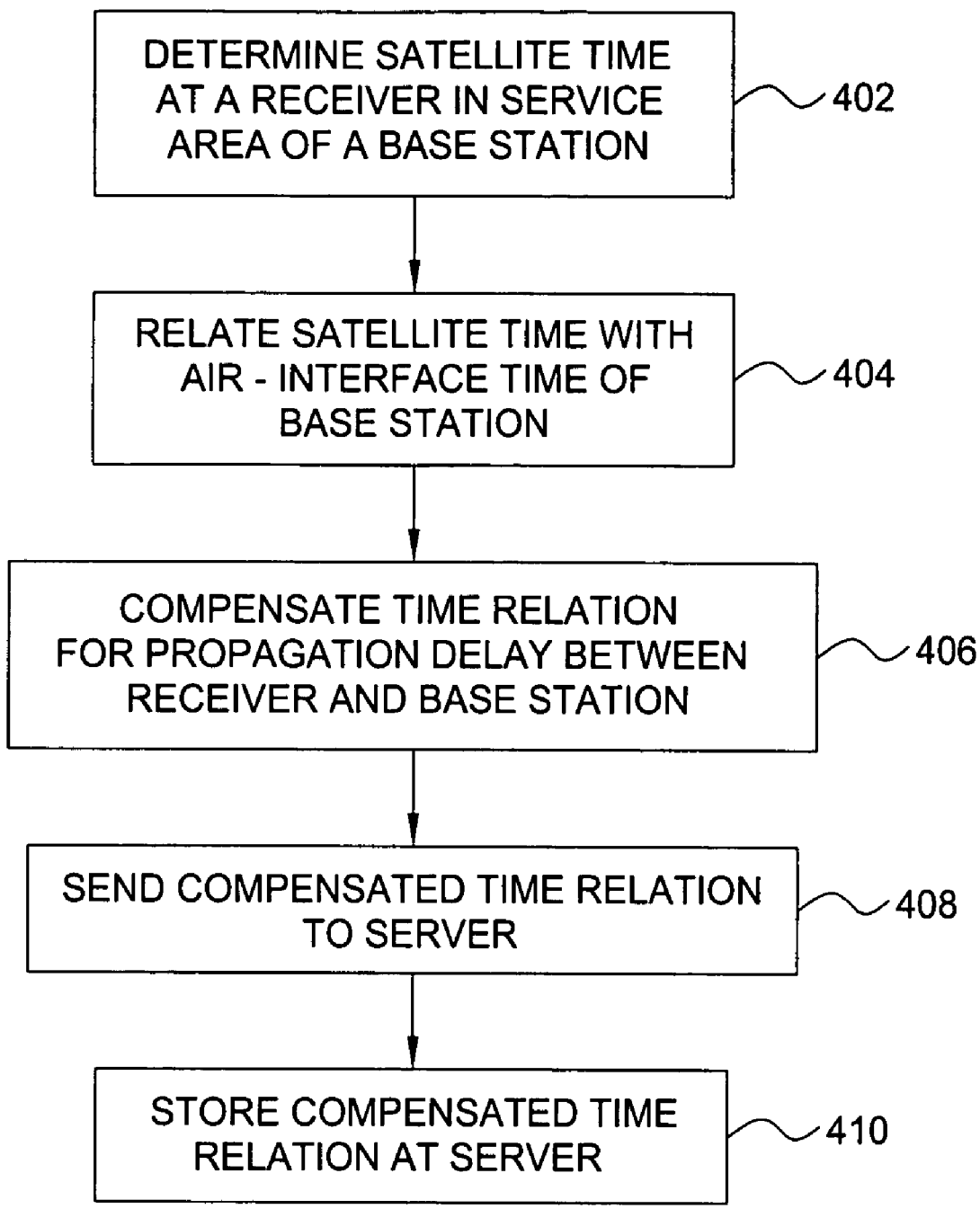
FIG. 4 is a flow diagram depicting an exemplary embodiment of a method for managing time in accordance with the invention.

FIG. 4 is a flow diagram depicting an exemplary embodiment of a method 400 for managing time in accordance with the invention. The method 400 may be understood with simultaneous reference to the position location system 100 of FIG. 1. For purposes of clarity by example, the method 400 is described with respect to the remote receiver 102A. The method 400 may also be performed by the remote receiver 102B. The method 400 begins at step 402, where satellite time is determined at the remote receiver 102A in the service area 112-1 of the base station 108-1. In one embodiment of the invention, the remote receiver 102A may determine satellite time by processing satellite signals from the satellites 110 to decode a time-of-week (TOW) value, which may be used to determine GPS time. The process of decoding satellite signals to obtain the TOW value is well known in the art. In another embodiment, the remote receiver 102A may compute satellite time (i.e., absolute time) using a "time-free" navigation solution. Notably, the remote receiver 102A may use a position estimate, a time estimate, and satellite trajectory data along with satellite measurements in a mathematical model to compute absolute time. An exemplary time-free navigation solution is described in commonly-assigned U.S. Pat. No. 6,734,821, issued May 11, 2004, which is incorporated by reference herein in its entirety.

At step 404, the derived satellite time is related to the air-interface timing of a wireless signal transmitted by the base station 108-1 to produce a time relation. In one embodiment, a relation is established between a TOW value and a frame number of the wireless signal transmitted by the base station 108-1 (e.g., a GSM frame number). In another embodiment, a time offset between the air-interface timing and satellite time is computed. In either case, a relationship is established between base station time and satellite time. At step 406, the time relation is compensated for propagation delay between the remote receiver 102A and the base station 108-1. In one embodiment, the remote receiver 102A appends a timing advance value to the time relation. As described below, the remote receiver 102A sends the time relation to the server 104. Thus, in another embodiment, the base station 108-1 may append a timing advance value to the time relation before propagating the time relation to the server 104.

Notably, TDMA communication systems compensate for the effect of propagation delays by synchronizing the arrival of transmissions from variously located mobile receivers to the slotted frame structures used by base stations. In order to synchronize transmissions from mobile receivers located in a base station service area, the base station typically transmits a timing advance (TA) value to each mobile receiver. A given mobile receiver advances its transmissions to the base station according to the TA value to compensate for the propagation delay between the mobile receiver and the base station. Typically, the TA values instruct the mobile receivers to advance their uplink transmissions such that the transmissions from all the mobile receivers served by a base station arrive at the base station in synchronism with a common receive frame structure. Such a timing advance technique is well known in the art.

At step 408, the compensated time relation is sent to the server 104. In one embodiment, the time relation is sent to the server 104 using a GPS measurement information element defined in ETSI TS 101 527, version 7.15.0 (also known as 3GPP TS 04.31 and referred to herein as TS 4.31), which is incorporated by reference herein in its entirety. Notably, TS 4.31 defines a GPS measurement information element for transmitting satellite measurements from the remote receiver 102A to the server 104 in an MS-assisted configuration. As shown in Table A.5 of TS 4.31 (reproduced below), the GPS measurement information element includes fields from reference frame, GPS TOW, the number of satellites to which measurements have been made, and the satellite measurement information. The presence column relates to whether the field is mandatory (M) or optional (O). The occurrences column relates to the number of times the given field is present in the information element.

TABLE A.5

| Element fields | Presence | Occurrences |
|---|---|---|
| Reference Frame | O | 1 |
| GPS TOW | M | 1 |
| # of Satellites (N_SAT) | M | 1 |
| Measurement Parameters | M | N_SAT |

The time relation may be sent to the server 104 using the GPS TOW field for providing the TOW value obtained at step 402 and the Reference Frame field for providing the frame number associated with the TOW value at step 404. At step 410, the compensated time relation is stored within the server 104. The method 400 may be repeated with respect to various base stations in the wireless communication network 106 such that the server 104 accumulates a collection of time relations associated with particular base stations. As described below, the time relation for a given base station may be used in the position location process of a remote receiver in the service area of the base station. This obviates the need for the remote receiver to determine satellite time from the satellite signals. In this manner, a single remote receiver (i.e., the remote receiver 102A) may act as an LMU for all the remote receivers in communication with the base station (e.g., the remote receiver 102B). This obviates the need for an actual LMU within the vicinity of the base station.

Figure 5:
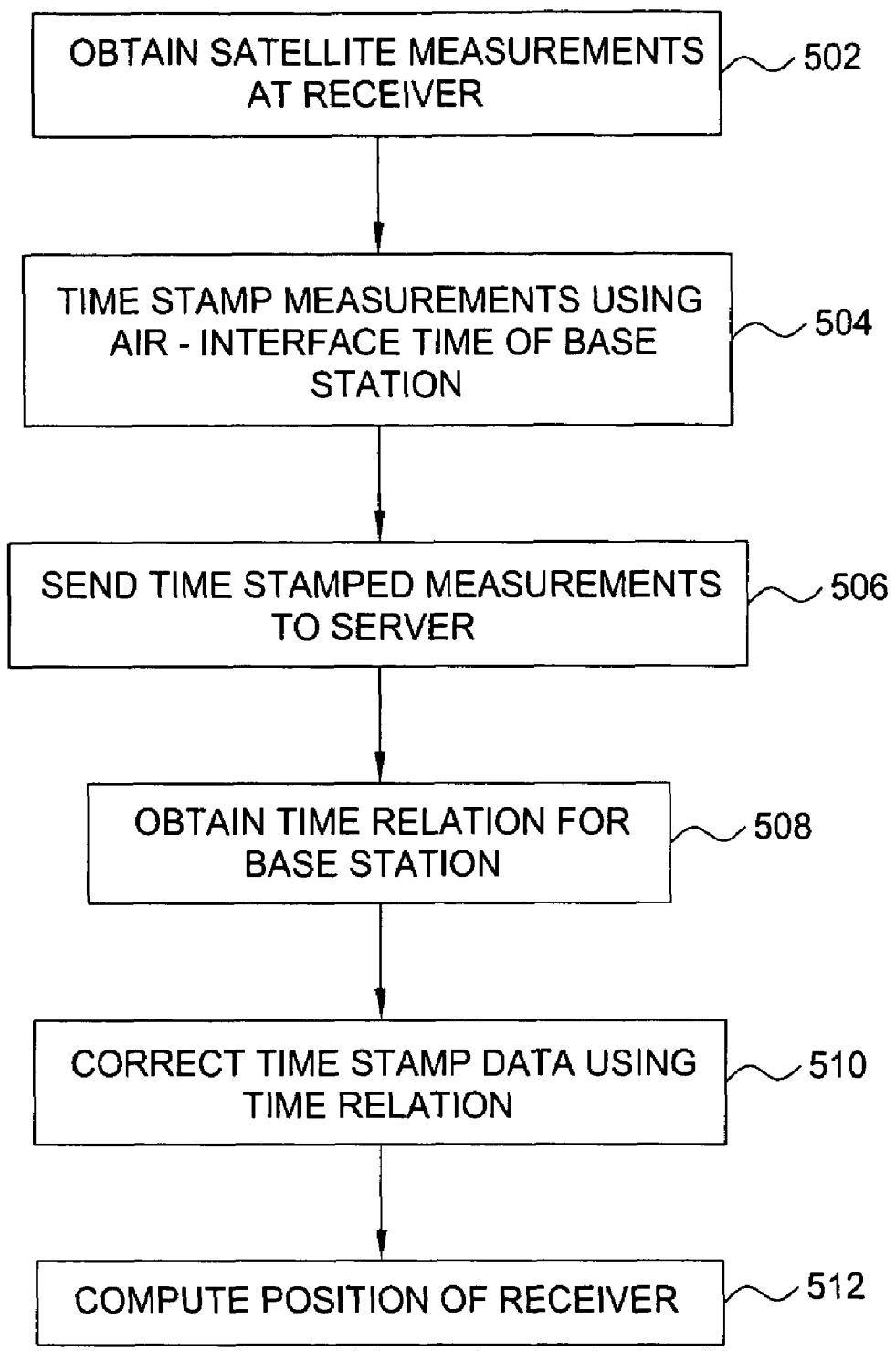
FIG. 5 is flow diagram depicting an exemplary embodiment of a method for location position of a remote receiver in accordance with the invention.

FIG. 5 is flow diagram depicting an exemplary embodiment of a method 500 for location position of a remote receiver in accordance with the invention. The method 500 may be understood with simultaneous reference to the position location system 100 of FIG. 1. For purposes of clarity by example, the method 500 is described with respect to the remote receiver 102B. The method 500 may also be performed by the remote receiver 102A. The method 500 begins at step 502, where satellite measurements are obtained at the remote receiver 102B. For example, the remote receiver 102B may measure pseudoranges to a plurality of satellites. The process of measuring pseudoranges using satellite positioning system signals is well known in the art. At step 504, the satellite measurements are time-stamped using the air-interface timing of the wireless link between the base station 108-1 and the remote receiver 102B.

At step 506, the time-stamped measurements are sent to the server 104. At step 508, a time relation corresponding to the base station 108-1 is obtained at the server 104. As described above, the server 104 may be configured to store a collection of time relations for the base stations of the wireless communication network 106, where each time relation comprises an association between the air-interface timing of a base station and satellite time. At step 510, the time-stamp data associated with the measurements is corrected using the time relation. For example, the server 104 may use the time relation to convert the value of a time stamp in terms of the air-interface timing of the base station to satellite time. At step 512, position of the remote receiver 102B is computed using the measurements and corrected time stamps. The position computation process is well known in the art.

Figure 6:
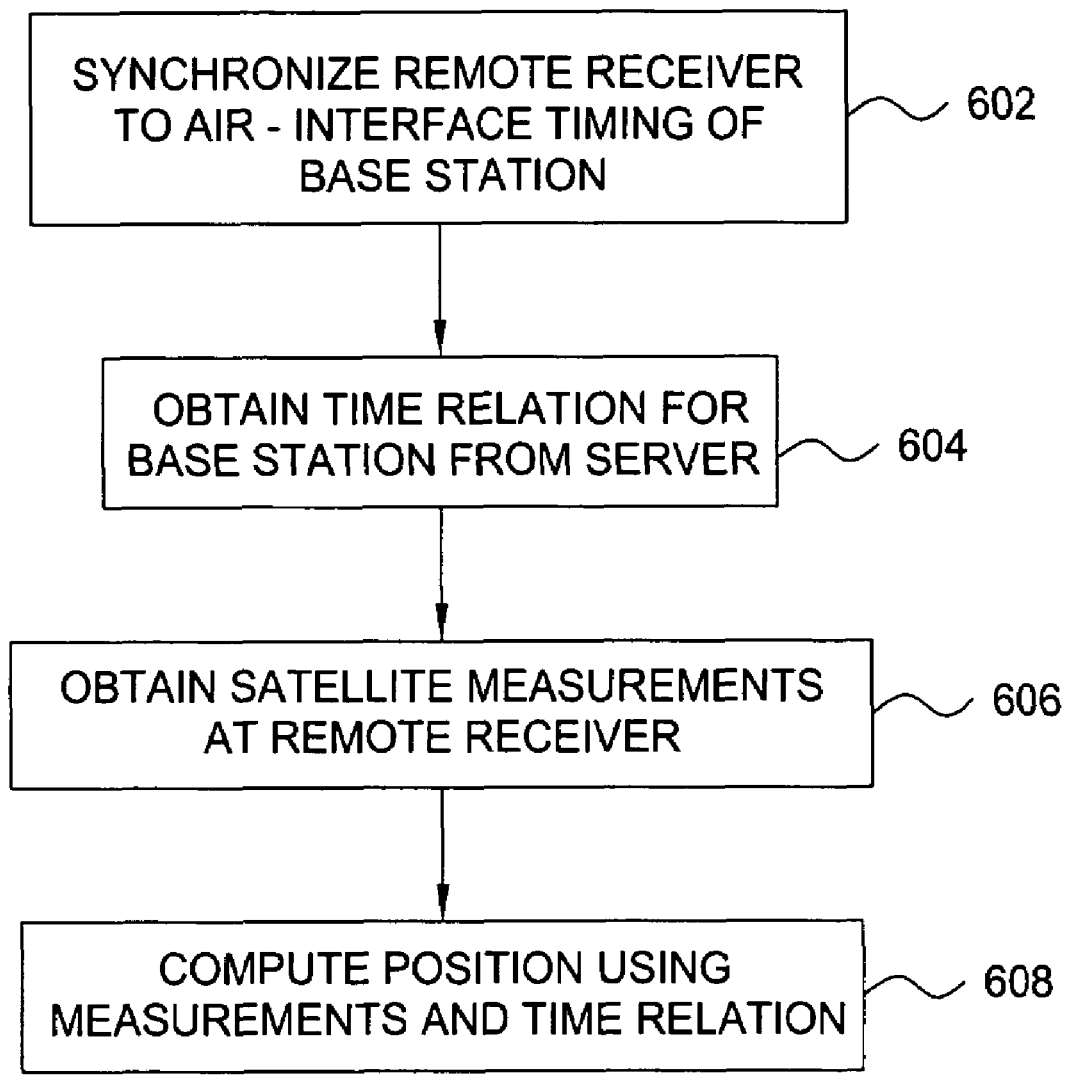
FIG. 6 is a flow diagram depicting another exemplary embodiment of a method for locating position of a remote receiver in accordance with the invention.

The method 500 may be employed in an MS-Assisted configuration. The invention may also be used in an MS-Based configuration. Notably, FIG. 6 is a flow diagram depicting another exemplary embodiment of a method 600 for locating position of a remote receiver in accordance with the invention. The method 600 may be understood with simultaneous reference to the position location system 100 of FIG. 1. For purposes of clarity by example, the method 600 is described with respect to the remote receiver 102A. The method 600 may also be performed by the remote receiver 102B. The method 600 begins at step 602, where the remote receiver 102B is synchronized to the air-interface timing of the base station 108-1. At step 604, a time relation for the base station 108-1 is obtained from the server 104. As described above, the server 104 may be configured to store a collection of time relations for the base stations of the wireless communication network 106, where each time relation comprises an association between the air-interface timing of a base station and satellite time.

In one embodiment, the time relation may be sent from the server 104 to the remote receiver 102B using a GPS assistance data element defined in TS 4.31. Notably, TS 4.31 defines a GPS assistance data element for providing assistance data to the remote receiver 102B in both an MS-Assisted and an MS-Based configuration. As shown in Table A.14 of TS 4.31, the GPS assistance data element includes a field for GPS TOW and a field for a frame number. The time relation may be sent to the remote receiver 102B using the GPS TOW field for providing a TOW value and the frame field for providing the frame number associated with the TOW value, where the TOW value and the frame number define the time relation.

At step 606, satellite measurements are obtained at the remote receiver 102B. For example, the remote receiver 102B may measure pseudoranges to a plurality of satellites. At step 608, position of the remote receiver 102B is computed using the measurements and the time relation. In one embodiment, the measurements may be time stamped using clock circuitry synchronized to the air-interface timing. The time relation is used to correct the time stamps to provide satellite time. In another embodiment, the measurements may be time stamped using clock circuitry that has been adjusted to properly track satellite time using the time offset.

In another embodiment of the invention, time is managed by storing at the remote receiver 102A and/or the remote receiver 102B time offsets between satellite time and the air-interface timing of base stations within the wireless communication network 106. The present embodiment may be used regardless of the configuration of the position location system 100 (e.g., MS-Assisted, MS-Based) and may be used to determine precise time-of-day. For example, in the present embodiment, the invention may determine satellite time to within 100 microseconds.

Figure 7:
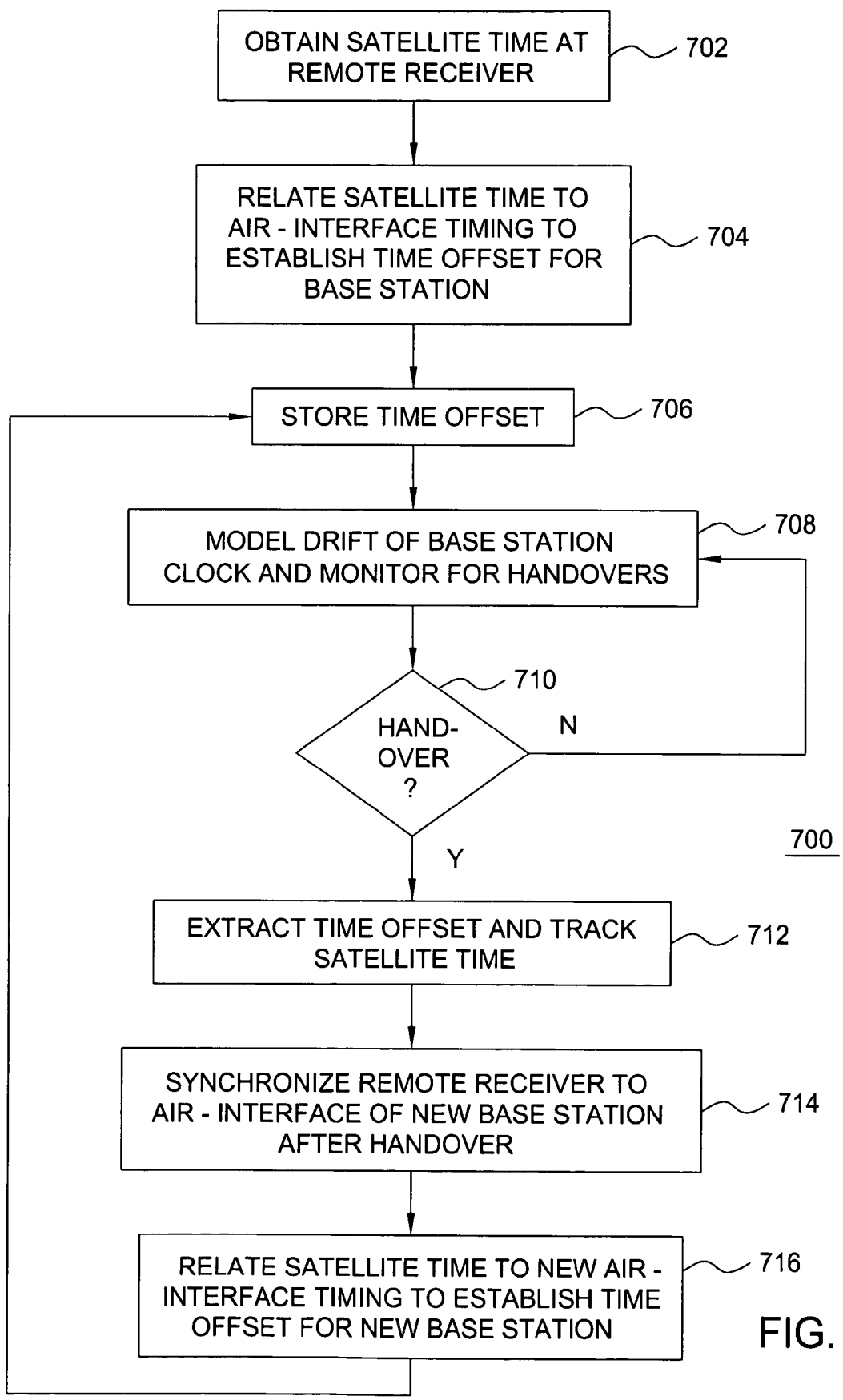
FIG. 7 is a flow diagram depicting another exemplary embodiment of a method for managing time in accordance with the invention.

In particular, FIG. 7 is a flow diagram depicting another exemplary embodiment of a method 700 for managing time in accordance with the invention. The method 700 may be understood with simultaneous reference to the position location system 100 of FIG. 1. For purposes of clarity by example, the method 700 is described with respect to the remote receiver 102A. The method 700 may also be performed by the remote receiver 102B. The method 700 begins at step 702, where satellite time is obtained at the remote receiver 102A in the service area 112-1 of the base station 108-1. Hitherto, the remote receiver 102A has no knowledge of precise satellite time. In one embodiment of the invention, the remote receiver 102A may determine satellite time by processing satellite signals from the satellites 110 to decode a time-of-week (TOW) value, which may be used to determine GPS time. In another embodiment, the remote receiver 102A may compute satellite time using a "time-free" navigation solution.

At step 704, the derived satellite time is related to the air-interface timing of a wireless signal transmitted by the base station 108-1 to produce a time offset. For example, a time offset may be formed between the frame timing of the base station and satellite time. Since the base station clock is highly accurate, and the frame timing is synchronous, accuracy of the computed time offset is maintained. At step 706, the time offset is stored within the remote receiver 102A. Once the time offset is stored in memory, the remote receiver 102A may go to sleep, be turned off, or otherwise be deactivated. If the remote receiver 102A is re-activated and detects the base station matching the time offset, precise satellite time may again be known. The clock circuitry of the remote receiver 102A may include a RTC to resolve any network rollover ambiguities. In one embodiment, the time offset stored in the remote receiver 102A is very small (e.g., 8 to 20 bytes). In addition, the present invention does not rely on anything that is new for the network (e.g., an LMU at the base station). In contrast, every remote receiver acts as its own LMU.

Most cellular telephones having integrated A-GPS receivers already have hardware in place for performing timing comparisons. Thus, the present invention fits right into the current method used to support LMUs, except time is measured locally within the remote receiver 102A, instead of being obtained externally. Moreover, no power is consumed during idle states. The air-interface timing is obtained every time the remote receiver 102A synchronizes to the network. The remote receiver 102A does not have to transmit signals to obtain this time relationship. The remote receiver 102A can be totally powered down and then started up in same cell and have precise time. Thus, the present invention saves power, while preserving precise satellite time. In addition, network frame counters are synchronous and stationary. Any Doppler shift caused by moving effects would be removed.

If the remote receiver 102A is handed off from one base station to another, the timing relationship may be lost in networks that do not synchronize base stations (e.g., GSM). Thus, at step 708, the remote receiver 102A monitors for handovers. Optionally, the remote receiver 102A may model the drift of a clock in the base station 108-1. Notably, the remote receiver 102A may make an accurate estimate of the long term drift rate of the base station clock as long as the remote receiver 102A remains in the service area of the base station. In this manner, the remote receiver 102A may improve the time offset stored for the base station 108-1.

At step 710 a determination is made as to whether the remote receiver 102A has been instructed to hand over to another base station. If not, the method 700 returns to step 708. If so, the method 700 proceeds to step 712. At step 712, the time offset for the base station 108-1 is extracted and used to track satellite time in the remote receiver 102A. For example, the remote receiver 102 A may use the time offset to transfer satellite time to counter circuitry during the handover. At step 714, the remote receiver 102A synchronizes to the air-interface timing of the new base station after the handover. Hitherto, the remote receiver 102A continues to track satellite time. At step 716, the satellite time is related to the new air-interface timing to establish a new time offset for the new base station. The method 700 may then return to step 706, where the new time offset is stored and the process repeated.

Figure 8:
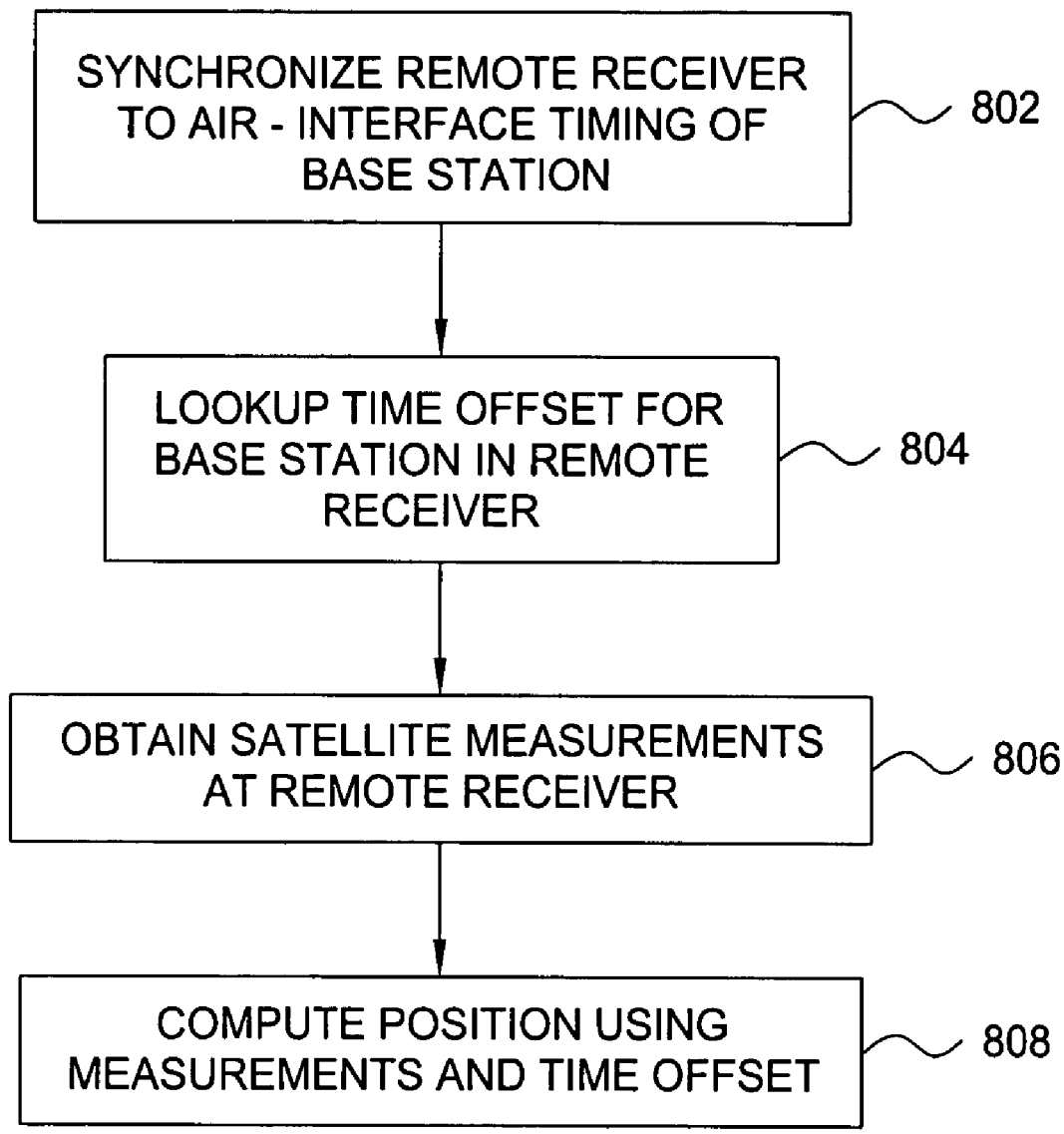
FIG. 8 is a flow diagram depicting another exemplary embodiment of a method for locating position of a remote receiver in accordance with the invention.

In this manner, the remote receiver 102A may store a collection of time offsets for various base stations in the wireless communication network 106. The remote receiver 102A may use the time offsets during position computation. In particular, FIG. 8 is a flow diagram depicting another exemplary embodiment of a method 800 for locating position of a remote receiver in accordance with the invention. The method 800 may be understood with simultaneous reference to the position location system 100 of FIG. 1 For purposes of clarity by example, the method 800 is described with respect to the remote receiver 102A. The method 800 may also be performed by the remote receiver 102B. The method 800 begins at step 802, where the remote receiver 102A is synchronized to the air-interface timing of the base station 108-1. At step 804, a time relation for the base station 108-1 is obtained from storage in the remote receiver 102A. As described above, the remote receiver 102A may be configured to store a collection of time offsets, where each time offset comprises an offset between the air-interface timing of a base station and satellite time.

At step 806, satellite measurements are obtained at the remote receiver 102A. For example, the remote receiver 102A may measure pseudoranges to a plurality of satellites. At step 808, position of the remote receiver 102A is computed using the measurements and the time offset. In one embodiment, the measurements may be time stamped using clock circuitry synchronized to the air-interface timing. The time offset is used to correct the time stamps to provide satellite time. In another embodiment, the measurements may be time stamped using clock circuitry that has been adjusted to properly track satellite time using the time offset.

In the preceding discussion, the invention has been described with reference to application upon the United States Global Positioning System (GPS). It should be evident, however, that these methods are equally applicable to similar satellite systems, and in particular, the Russian GLONASS system, the European GALILEO system, combinations of these systems with one another, and combinations of these systems and other satellites providing similar signals, such as the wide area augmentation system (WAAS) and SBAS that provide GPS-like signals. The term "GPS" used herein includes such alternative satellite positioning systems, including the Russian GLONASS system, the European GALILEO system, the WMS system, and the SBAS system, as well as combinations thereof.

While the foregoing is directed to embodiments of the present invention, other and further embodiments of the invention may be devised without departing from the basic scope thereof, and the scope thereof is determined by the claims that follow.

The invention claimed is:

1. A method, comprising:
   determining satellite time for a satellite constellation using a first mobile satellite positioning system (SPS) receiver, wherein said first mobile SPS receiver is operable to receive service via said base station;
   producing, at said mobile SPS receiver, a time relation between said satellite time, an air-interface time of a base station and a propagation-delay time, wherein said propagation-delay time comprises at least one of a timing advance and a round trip time; and
   sending said time relation from said first mobile SPS receiver to one of a server and a memory in said SPS receiver.

2. The method of claim 1, further comprising:
   computing a time offset between said satellite time and said air-interface time from said time relation at said server.

3. The method of claim 2, wherein said time relation comprises an association between said satellite time and a frame number.

4. The method of claim 1, wherein said time relation comprises a time offset between said satellite time and said air-interface time.

5. The method of claim 1, further comprising:
   compensating said time relation for a propagation delay between said base station and said first mobile SPS receiver.

6. The method of claim 5, wherein said step of compensating comprises:
   sending a value indicative of a timing advance from said first mobile SPS receiver to said server.

7. The method of claim 5, wherein said step of compensating comprises:
   appending a value indicative of a timing advance to said time relation at said base station.

8. The method of claim 1, further comprising:
   obtaining satellite measurements at a second SPS receiver;
   time stamping said satellite measurements using said air-interface time;
   sending said time stamped satellite measurements to said server;
   computing position of said second SPS receiver using said time stamped satellite measurements and said time relation.

9. The method of claim 1, further comprising:
   obtaining satellite measurements at a second SPS receiver;
   time stamping said satellite measurements using said air-interface time;
   obtaining data indicative of said time relation at said second SPS receiver from said server; and
   computing position of said second SPS receiver using said time stamped satellite measurements and said data.

10. The method of claim 9, wherein said data comprises a value associated with said satellite time and a frame number.

11. The method of claim 1, wherein said step of determining said satellite time comprises:
    processing satellite signals in said first mobile SPS receiver to decode a time value.

12. The method of claim 1, wherein said step of determining said satellite time comprises:
    obtaining satellite measurements, a position estimate, a time estimate, and satellite trajectory data at said first mobile SPS receiver; and
    relating said satellite measurements, said position estimate, said time estimate, and said satellite trajectory data using a mathematical model to compute a time value.

13. A method, comprising:
    determining, at a mobile satellite positioning system (SPS) receiver at a first time, a satellite time for a satellite constellation, wherein said mobile SPS receiver is operable to receive service via a base station;
    determining a time offset from said satellite time as a function of an air-interface time of said base station and a propagation-delay time, wherein said propagation-delay time comprises at least one of a timing advance and a round trip time;
    storing said time offset; and
    computing, at a second time, a position of said mobile SPS receiver using satellite measurements and said stored time offset.

14. The method of claim 13, wherein said step of computing comprises:
    synchronizing clock circuitry in said mobile SPS receiver to said air-interface time; and
    compensating said clock circuitry using said time offset.

15. The method of claim 13, further comprising:
    deactivating said mobile SPS receiver in response to storage of said time offset; and
    activating said mobile SPS receiver prior to computing said position.

16. The method of claim 13, wherein said step of determining said satellite time comprises:
    processing satellite signals in said mobile SPS receiver to decode a time value.

17. The method of claim 13, wherein said step of determining said satellite time comprises:
    obtaining initial satellite measurements, a position estimate, a time estimate, and satellite trajectory data at said mobile SPS receiver; and
    relating said initial satellite measurements, said position estimate, said time estimate, and said satellite trajectory data using a mathematical model to compute a time value.

18. A method, comprising:

determining, at a mobile satellite positioning system (SPS) receiver at a first time, a satellite time for a satellite constellation, wherein said mobile SPS receiver is operable to receive service via a base station;

determining a time offset from said satellite time as a function of an air-interface time of said base station and a propagation-delay time, wherein said propagation-delay time comprises at least one of a timing advance and a round trip time;

storing said time offset;

synchronizing, at a second time, clock circuitry in said mobile SPS receiver to said satellite time using said time offset in response to a handover from said base station to another base station; and determining another time offset between said satellite time and another air-interface time of said other base station using said synchronized clock circuitry.

19. A position location system, comprising:

a base station having an air-interface time associated therewith;

a mobile satellite positioning system (SPS) receiver operable to receive service from said base station, wherein said mobile SPS receiver is operable to determine satellite time for a satellite constellation and produce a time relation as a function of said satellite time, air-interface time and a propagation-delay time, wherein said propagation-delay time comprises at least one of a timing advance and a round trip time; and a server for receiving said time relation from said mobile SPS receiver.

* * * * *